3,070,604
FIRE RESISTANT COMPOUND

Folsom E. Drummond, Washington, D.C., assignor to Basic Research Corporation, Dayton, Ohio, a corporation of Delaware
No Drawing. Filed July 26, 1960, Ser. No. 45,302
9 Claims. (Cl. 260—313)

This invention relates to a new and useful class of compounds and their preparation, and more particularly to pyrrylamidophosphates and polymers thereof. Such compounds and their polymers are useful as chemical intermediates, and as adhesives, lubricants, pharmaceuticals, cosmetics and water-treating materials, and fire and flame resistant substances.

The invention comprises five-membered heterocyclic compounds having the general structural formula:

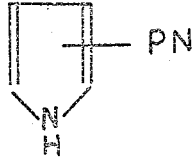

where PN represents the amidophosphate structure

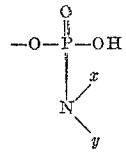

where $x$ is hydrogen, alkyl or aryl radical, $y$ is hydrogen, alkyl or aryl radical, and where $x$ may be the same or different from $y$.

The corresponding polymer structure is represented by the formula:

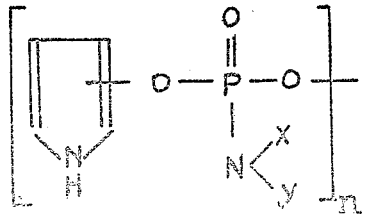

where $x$ and $y$ having the values given and $n$ is an integer from 1 to 8 and higher.

The pyrramidophosphates of this invention may be prepared by reacting a pyrrole with an amidophosphoryl chloride and separating the resultant pyrrylamidophosphate from the reaction mixture. The compounds of the invention are suitably prepared starting with hydroxy pyrrylmagnesium bromide and reacting the same with amidophosphorylchloride to form the corresponding pyrrylamidophosphate and magnesium bromyl chloride.

The equation for this reaction is illustrated as follows:

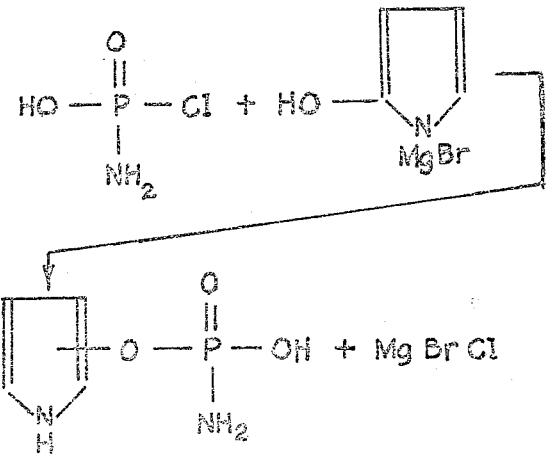

The polyesters of pyrrylamidophosphate may be obtained by condensation of hydroxyl pyrrole with amidophosphoric acid, the condensation reaction being carried out by heating the mixture at temperatures between 200° and 350° C. for three to six hours. The following equation illustrates the reaction to form a polyester structure as in the case of the amine pyrrylphosphate.

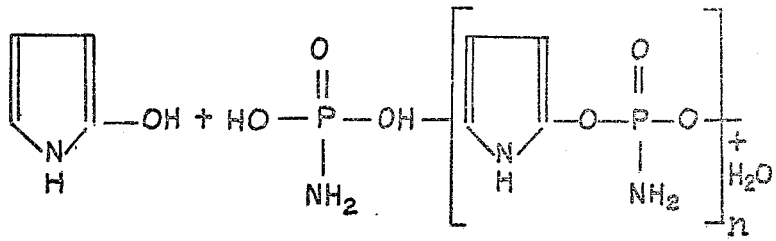

The invention is further exemplified by the following examples which it will be understood are not limitative of the invention. The parts are by weight unless otherwise indicated.

EXAMPLE 1

*2-Pyrrylamidophosphate*

A mixture comprising one molecular equivalent part (1 mole) in grams of hydroxy pyrrylmagnesium bromide and one molecular equivalent part (1 mole) in grams of amidophosphoryl monochloride is reacted at a temperature of 200° C. for one hour in the presence of 0.1 gram of magnesium chloride, the reaction being carried out under an inert atmosphere of nitrogen. The reaction product recovered by filtering and fractional distillation of the residue consists of pyrrylamidophosphate

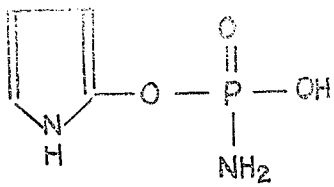

EXAMPLE 2

*Pyrrylamidophosphate Polymer*

The reaction product of Example 1 is polymerized by heating the reactant mixture at a temperature of 200° C. for three hours to obtain a polymer having the basic molecular structure

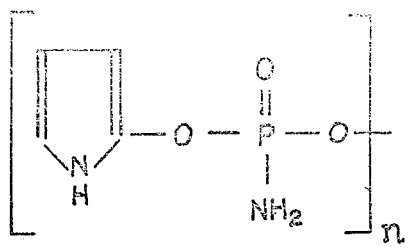

EXAMPLE 3

In this example the reaction is carried out similarly as described in Example 1, except that dimethyl amidophosphate is used in place of amidophosphate to produce the corresponding dimethyl amidopyrrylamidophosphate. The structure is illustrated as follows:

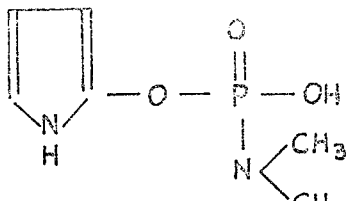

EXAMPLE 4

In this example the reaction is carried out similarly as in Example 1, using diethylamidophosphate in place of amidophosphate to form the corresponding diethylpyrrylamidophosphate. The structure is illustrated as follows:

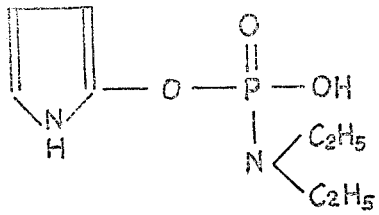

EXAMPLE 5

In this example the reaction is carried out as described in Example 1, using dibenzyl amidophosphate as the reactant with the hydroxy pyrrole to form the corresponding aryl derivative. The structure is illustrated as follows:

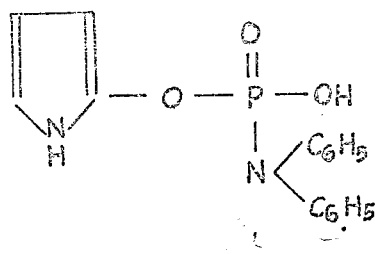

The polymers may be used in different physical forms in fabricating various products. They may be drawn into fibers and filaments and fashioned in fabrics and the like to provide fireproof materials.

In place of employing catalysts such as magnesium chloride, the equivalent alkali metal halide compounds may be used such as calcium, beryllium, zinc, or aluminum or titanium.

The compounds of the present invention may be modified by various substitute products, particularly with respect to the amidophosphate reactant to form derivatives of the amidopyrrylphosphates.

The foregoing invention has been described with particular reference to the amidopyrrylphosphate compounds, but it will be understood that derivative amido compounds of the pyrrylphosphate structure as hereinbefore illustrated and described is within the spirit and scope of this invention, and as described hereinabove and defined in the appended claims.

What is claimed is:

1. A compound of the formula

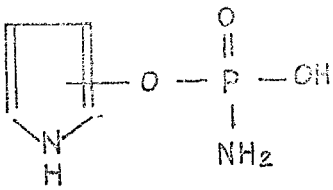

2. A compound of the formula

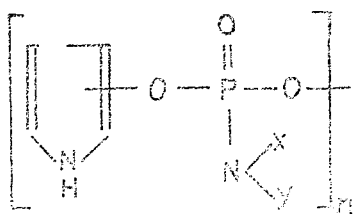

where $x$ is selected from the group consisting of hydrogen, lower alkyl and benzyl radical and $y$ is selected from the group consisting of hydrogen, lower alkyl and benzyl.

3. A compound of the formula

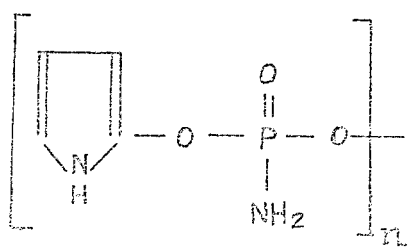

where $n$ is at least 2.

4. A method of preparing a pyrrylamidophosphate which comprises reacting a hydroxy pyrrylmagnesium bromide with an amidophosphoryl chloride at a temperature of 200° C. under an inert atmosphere, and recovering the resultant pyrrylamidophosphate reaction product.

5. A method of preparing a pyrrylamidophosphate polymer which comprises reacting a hydroxy pyrrylmagnesium bromide with an amidophosphoryl chloride at a temperature of 200° C. for 3 to 4 hours under an inert atmosphere, and recovering the resultant pyrrylamidophosphate polymer reaction product.

6. A method of preparing polyesters of pyrrylamidophosphate comprising heating a hydroxy pyrrole with an amidophosphoric acid for several hours at a reaction temperature of 200 to 300° C. under an atmosphere of nitrogen, and separating the resultant polyester formed.

7. A method of preparing pyrrylamidophosphates as in claim 6, wherein the phosphate reactant is dimethyl amidophosphate.

8. A method of preparing pyrrylamidophosphates as in claim 6, wherein the phosphate reactant is diethyl amidophosphate.

9. A method of preparing pyrrylamidophosphates as in claim 6, wherein the phosphate reactant is dibenzyl amidophosphate.

References Cited in the file of this patent

UNITED STATES PATENTS 2,146,584    Lipkin _____ Feb. 7, 1937